Feb. 21, 1933.  A. F. KRUMHOLZ  1,898,014
FEEDING DEVICE FOR ELECTRIC WELD RODS OR WIRE
Filed July 17, 1931  2 Sheets-Sheet 1
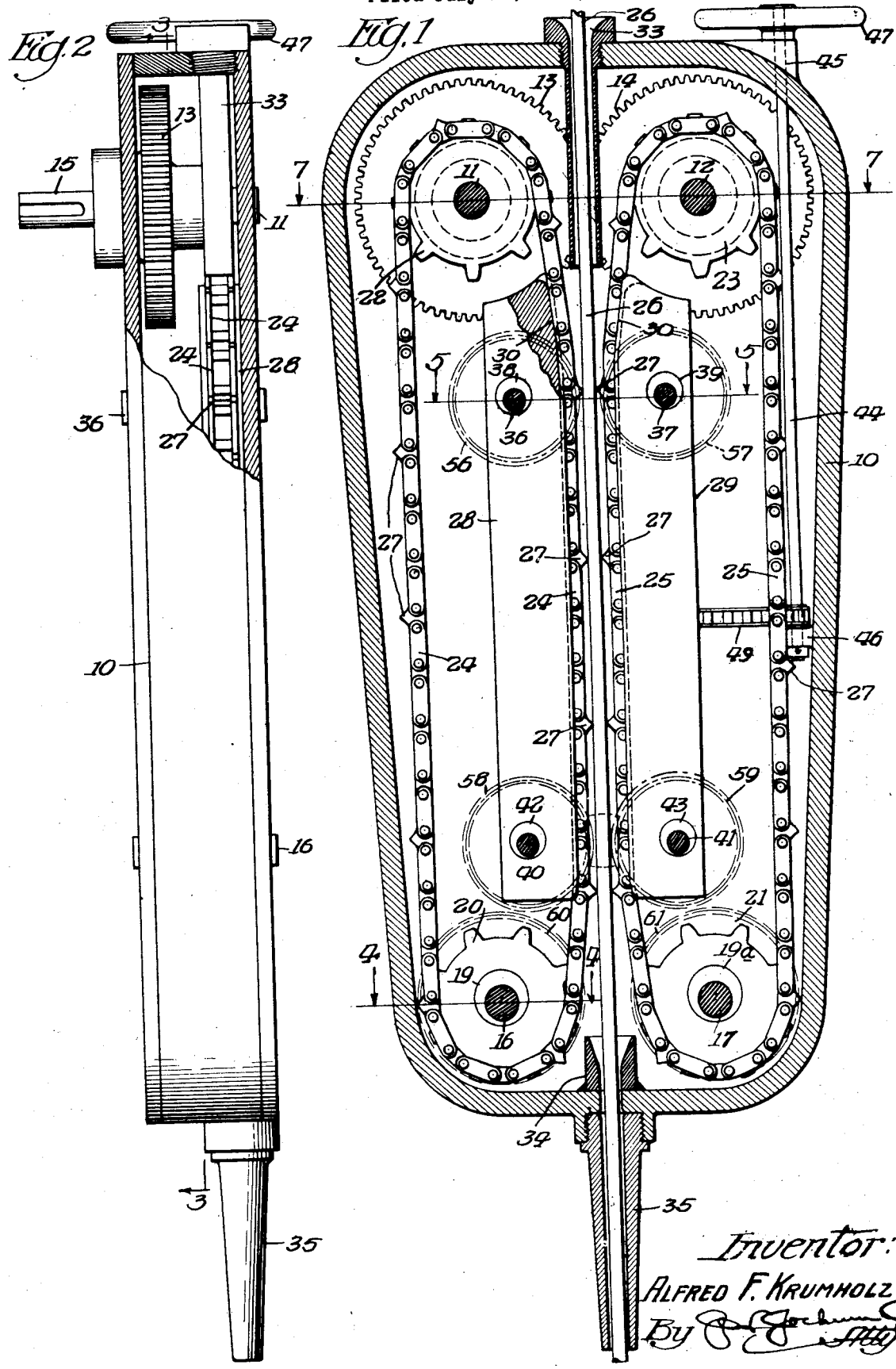
Inventor:
ALFRED F. KRUMHOLZ Feb. 21, 1933.  A. F. KRUMHOLZ  1,898,014
FEEDING DEVICE FOR ELECTRIC WELD RODS OR WIRE
Filed July 17, 1931  2 Sheets-Sheet 2
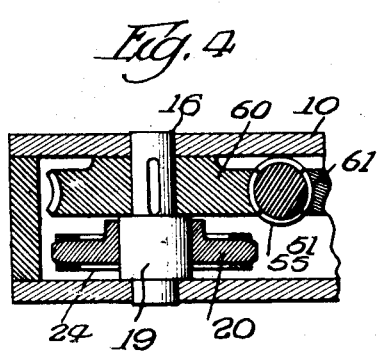
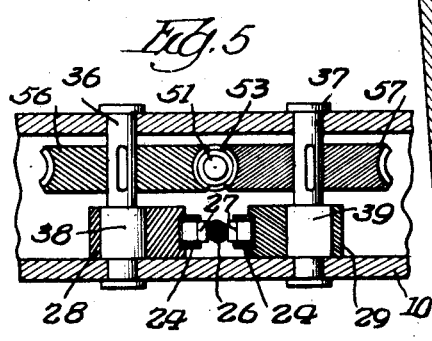
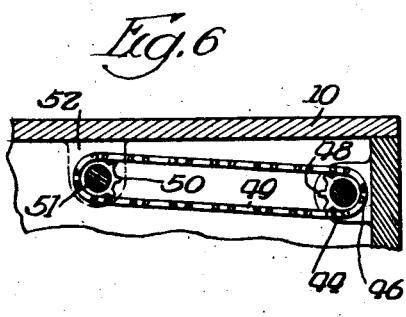
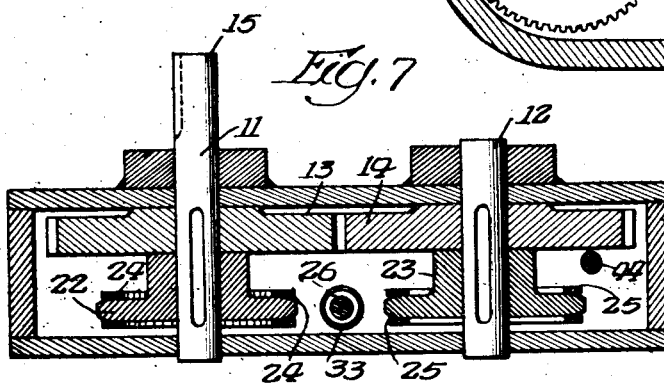
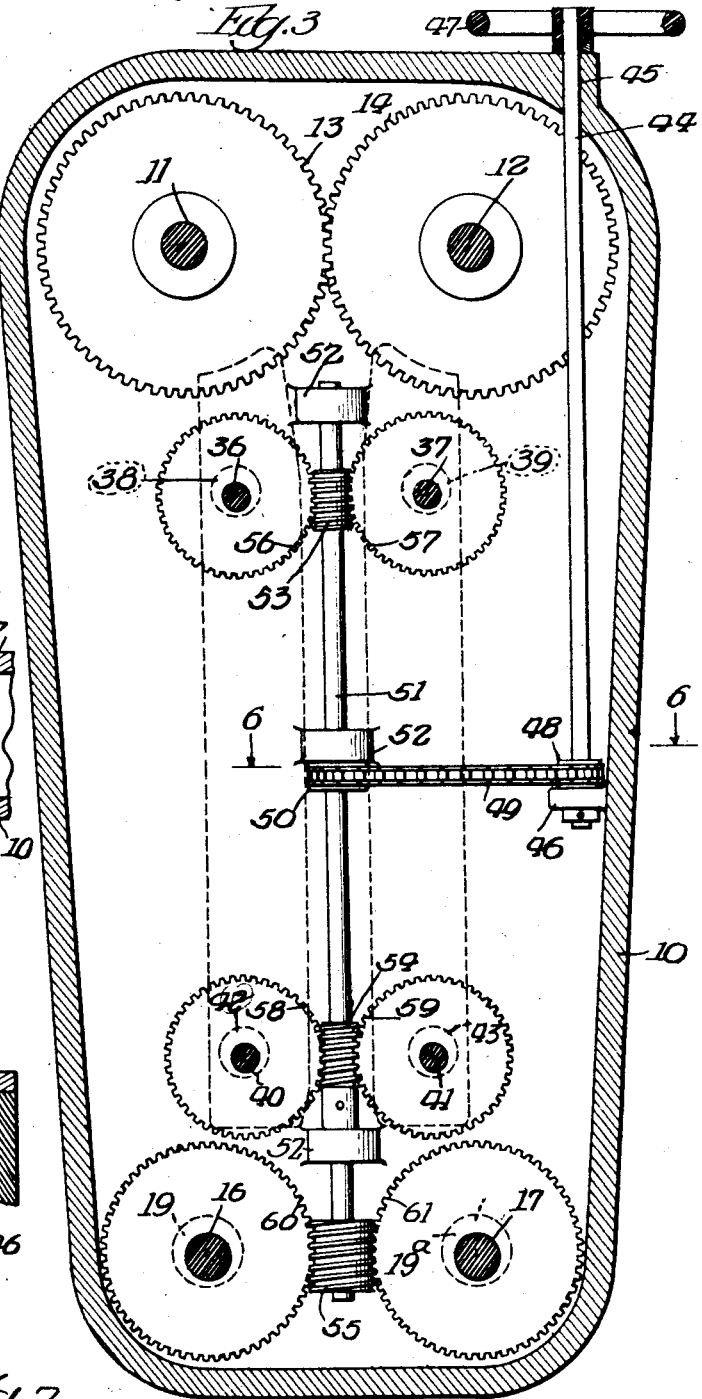
Inventor:
ALFRED F. KRUMHOLZ Patented Feb. 21, 1933

1,898,014

UNITED STATES PATENT OFFICE

ALFRED F. KRUMHOLZ, OF CHICAGO, ILLINOIS

FEEDING DEVICE FOR ELECTRIC WELD RODS OR WIRE

Application filed July 17, 1931. Serial No. 551,450.

This invention relates in general to arc welding machines in which fusible or destructible covered metallic electrodes or weld rods are employed.

It has been demonstrated that the best results can be obtained by the use of covered electrodes or rods, but inasmuch as the rods are entirely covered, difficulty has been experienced in feeding the rods through automatic devices, and in obtaining electric contact throughout the length of the rod.

As the operation of the welding progresses the fusible electrode or rod is automatically fed to the welding point and is consumed in the rate of progress of the operation.

In order to provide an effective operation, it is necessary to maintain electrical contact with the rod. Some of the coatings are hard and brittle, while others are not hard enough to prevent the penetration of the coating, so that feeding elements may procure a grip upon the rod to advance it. In the former type of covering it is necessary to prepare the rod for the feeding mechanism so that such electrical contact can be obtained.

It is one of the objects of the present invention to provide improved means for gripping and advancing the rod, the gripping means operating to penetrate the covering or coating to contact with the bare rod to provide the necessary contact.

A further object is to provide in an improved feeding mechanism of this character means for compensating rods or wire of varying diameters.

A further object is to provide an improved feeding mechanism of this character which will be of a simple, durable and compact structure, well adapted to be applied or attached to the automatic rod feeding device of arc welding machine.

To the attainment of these ends and the accomplishment of other new and useful objects as will appear, the invention consists in the features of novelty in substantially the construction, combination and arrangement of the several parts, hereinafter more fully described and claimed, and shown in the accompanying drawings illustrating this invention, and in which Figure 1 is a vertical sectional view of a device of this character constructed in accordance with the principles of this invention.

Figure 2 is a left hand elevation of Figure 1 with parts omitted, parts broken away, and parts in section.

Figure 3 is a sectional view taken on line 3—3, Figure 2, with parts omitted.

Figure 4 is a detailed sectional view taken on line 4—4, Figure 1.

Figure 5 is a sectional view taken on line 5—5, Figure 1.

Figure 6 is a detailed sectional view taken on line 6—6, Figure 3.

Figure 7 is a detailed sectional view taken on line 7—7, Figure 1.

Referring more particularly to the drawings, the numeral 10 designates generally a supporting structure preferably in the form of a casing of any desired size and shape adapted to be supported or secured to a welding machine in any desirable or suitable manner, not shown.

Arranged within the casing and adjacent the top thereof are shafts 11—12 suitably journaled, and connected with these shafts are gears 13—14 which mesh with each other, one of the shafts being driven in any desired or suitable manner through the medium of power mechanism applied to the projecting end 15 of the shaft.

Arranged adjacent the lower portion of the casing 10 and journaled in suitable bearings are shafts 16—17, respectively arranged in alinement with shafts 11—12. The shaft 16 is journaled in suitable bearings and carried by the shaft is an eccentric 19. Loosely mounted upon said eccentric 19 is a sprocket wheel 20. The shaft 17 is also journaled in suitable bearings and carried by this shaft is an eccentric 19ª, and loosely mounted upon the eccentric 19ª is a sprocket wheel 21.

Connected with the respective shafts 11—12 are sprocket wheels 22—23 and passing over the sprocket wheels 20 and 22 is an endless flexible member 24 preferably in the form of a sprocket chain, and passing over the sprocket wheels 21—23 is an endless flexible member 25 also preferably in the form of a sprocket chain. The flexible members 24—25 are so arranged with respect to each other that one of the runs of each will be arranged in proximity to each other and parallel to form a space therebetween for the reception of a weld rod 26, and carried by the flexible members are elements 27 preferably in the form of projections spaced in directions lengthwise of the respective endless members and which projections are adapted to co-operate with each other and to be brought into contact with the rod for gripping the rod therebetween.

The respective adjacent runs of the endless members pass over spaced substantially parallel guides 28—29 which are so shaped at their upper portions as at 30, to cause the runs of the endless members to be gradually brought together and the projections 27 into contact with the rod. These guides are so located, that the extremities of the projections 27 will penetrate the covering or coating of the rod a sufficient distance so as to contact with the bare surface of the rod, to form not only a gripping means for advancing the rod, but also to form electrical contacts arranged and spaced lengthwise of the rod.

Motion is imparted to the endless members 24—25 through the medium of power applied to the shaft 15, and 12 and the gears 13—14 which mesh with each other.

The rod 26 is fed into the casing through a suitable guide 33 which is arranged in alinement with the space between the adjacent runs of the flexible members 24—25, and passes out of the casing through a guide 34, terminating in a nozzle or extended guide 35.

As a means for compensating the varying diameters of rods and for the purpose of adapting the machine for feeding rods of different diameters, the guides 28—29, as well as one of the sprocket wheels over which each of the endless members pass, are mounted for adjustment, and to that end shafts 36—37 are provided, which are suitably journaled preferably in the walls of the casing 10, and pass through the respective guides 28—29 adjacent one end thereof. Connected respectively with the shafts 36—37 are eccentrics 38—39 which have bearings in the guides 28—29. Similar shafts 40—41 are arranged adjacent the other ends of the guides and are journaled in the casing walls, and eccentrics 42—43 are connected respectively with the shafts 40—41 and are journaled in the guides.

To vary the space between the adjacent runs of the endless members it is only necessary to adjust the guides. This may be accomplished in any desirable or suitable manner, and to that end there may be provided a shaft 44 which is journaled in suitable bearings 45—46. One end of the shaft extends beyond the casing 10 and is provided with an operating handle 47.

At any suitable point on the shaft is secured a sprocket wheel 48 over which an endless sprocket chain 49 passes. This chain also passes over a sprocket wheel 50 secured to an upright shaft 51, journaled in suitable bearings 52. Connected with the shaft 51 are worms 53—54 and 55. The worm 53 is arranged adjacent the shafts 36—37 and meshes with worm gears 56—57 connected respectively with the eccentrics 38—39, and the worm 54 meshes with worm gears 58—59 connected respectively with the eccentrics 42—43, so that when the handle 47 is actuated to rotate the shaft 44, it will be manifest that through the medium of the sprocket chain 49 the shaft 51 will be correspondingly rotated and this shaft will, through the medium of the worms 53—54 rotate the respective worm gears 56—57, and 58—59 meshing therewith. As these worm gears are rotated the eccentrics 38—42, 39—43 will be rotated to adjust the guides 38—39 towards or away from each other according to the direction of rotation of the shaft 51.

As the guides 28—29 are moved away from each other, it is manifest that there will be some slack in the endless flexible members 24—25, and likewise when the guides are adjusted towards each other there may be created a strain on the endless members, therefore it is necessary to provide means whereby such adjustments of the guides may be obtained without injury to the endless flexible members and without effecting their operation.

To that end it is necessary to adjust the sprocket wheels 20—21 at one time, so as to permit some slack in the endless flexible members and at another time to take up slack. This is accomplished at the same time as the adjustment of the guides 29 through the medium of the worm 55 which meshes with worm gears 60 and 61 connected respectively to the shafts 16—17, so that when the shafts 16 and 17 are rotated, the eccentric 19—19ª will be correspondingly rotated, thereby bodily adjusting the sprocket wheels 20—21.

It will therefore be manifest that by rotation of the shaft 51 the guides 28—29 as well as the sprockets 20—21 will be simultaneously adjusted.

By the provision of the portions 30 at the tops of the guides 28—29, it will be manifest that the projections 27 on the endless flexible members 24—25 will be gradually brought towards each other and into contact with the weld rod, and as the elements contact, and as the portion of the flexible members carrying the projections 27 pass over the guides 28—29, the projections will be forced through the coating of the rod and into contact with the body or a bare portion of the rod itself.

While the preferred form of the invention has been herein shown and described, it is to be understood that various changes may be made in the details of construction, and in the combination and arrangement of the several parts, within the scope of the claims, without departing from the spirit of this invention.

What is claimed as new is:—

1. In an electric welding machine, means for feeding a coated fusible weld rod, said means embodying chains having an extended substantially parallel movement and between which members the rod to be fed is arranged, spaced drums over which the chains pass, means for actuating said drums, means carried by said members and operating to penetrate said coating to grip the rod for advancing the same, and stationary guides over which the adjacent portions of the chains intermediate the drums pass.

2. In an electric welding machine, means for feeding a coated fusible weld rod, said means embodying chains having an extended substantially parallel movement and between which members the rod to be fed is arranged, spaced drums over which the chains pass, means for actuating said drums, means carried by said members and operating to penetrate said coating to grip the rod for advancing the same, and means for adjusting the portions of said members intermediate the drums in directions towards and away from each other and for maintaining them in their adjusted position to compensate rods of varying diameters.

3. In an electric welding machine, means for feeding a coated fusible weld rod, said means embodying a pair of endless flexible members, drums about which said members pass, the adjacent runs of said members being arranged parallel and spaced for the reception of the rod therebetween, rod engaging elements carried by the flexible members and adapted to contact with and grip the bare rod at points spaced longitudinally of the rod, guides for holding the portions of the said adjacent runs of the flexible members between the drums against lateral separation, and means for actuating said flexible members.

4. In an electric welding machine, means for feeding a coated fusible weld rod, said means embodying a pair of endless flexible members, drums about which said members pass, the adjacent runs of said members being arranged parallel and spaced for the reception of the rod therebetween, rod engaging elements carried by the flexible members and adapted to contact with and grip the bare rod at points spaced longitudinally of the rod, guides for holding the portions of the said adjacent runs of the flexible members intermediate said drums against lateral separation, and means for rotating said drums, said guides being shaped to cause the said runs of the flexible members to gradually approach each other as they move into engagement with the rod.

5. In an electric welding machine, means for feeding a coated fusible weld rod, said means embodying a pair of endless flexible members, drums over which the said members pass, the adjacent runs of said members being arranged parallel and spaced for the reception of the rod therebetween, rod engaging elements carried by the flexible members and adapted to contact with and grip the bare rod at points spaced longitudinally of the rod, guides for holding the portions of said adjacent runs of the flexible members between the drums against lateral separation, means for actuating said drums, and means for adjusting the guides to vary the space between the adjacent runs of the flexible members between the drums to compensate rods of different diameters.

6. In an electric welding machine, means for feeding a coated fusible weld rod, said means embodying a pair of endless flexible members, drums over which the flexible members pass, the adjacent runs of said members being arranged parallel and spaced for the reception of the rod therebetween, rod engaging elements carried by the flexible members and adapted to contact with and grip the bare rod at points spaced longitudinally of the rod, guides for holding the portions of the said adjacent runs of the flexible members between the drums against lateral separation, means for actuating said drums, means for adjusting the guides to vary the space between the adjacent runs of the flexible members between the drums to compensate rods of different diameters, and means for taking up the slack in the said flexible members.

7. In an electric welding machine, means for feeding a fusible weld rod, said means embodying endless flexible members with one of their runs parallel and spaced from each other to form a space for the rod therebetween, guides over which said adjacent runs pass to hold them against separation, means for imparting a traveling motion to said endless members, and gripping elements carried by and spaced lengthwise of said flexible members and adapted to contact with and grip the rod for advancing the rod, adjusting means for the guides to vary the space between the adjacent runs of the flexible members, adjusting means for taking up the slack in the endless members when said guides are adjusted, and means common to said adjusting means for actuating them.

8. In an electric welding machine, means for feeding a coated fusible weld rod, said means embodying endless flexible members, drums over which said members pass, one of the runs of the members being parallel and spaced from each other to form an extended space for the rod therebetween, stationary guides intermediate the drums and over which said runs pass to hold them against separation, means for imparting a traveling motion to the flexible members, and penetrating elements connected with and spaced in directions lengthwise of said flexible members for penetrating the coating of the rod and engaging bare spaces on the rod for gripping and advancing the rod.

9. In an electric welding machine, means for feeding a coated fusible weld rod, said means embodying endless flexible members with one of their runs parallel and spaced from each other to form an extended space for the rod therebetween, drums over which said members pass, guides intermediate the drums and over which said runs pass to hold the portions between the drums against separation, means for imparting a traveling motion to the flexible members, penetrating elements connected with and spaced in directions lengthwise of said flexible members for penetrating the coating of the rod and engaging bare spaces on the rod for gripping and advancing the rod, and means for adjusting the guides one with relation to the other and independently with respect to said drums to vary the space between the adjacent runs of the flexible members to compensate rods of different diameters.

10. In an electric welding machine, spaced pairs of rotatable elements, the elements of each pair being spaced, one of the elements of each pair rotatable about a fixed axis, endless flexible members passing over the respective pairs of said elements, adjacent runs of the flexible members between the co-operating pairs of rotatable elements being parallel and spaced from each other to form a space therebetween for a weld rod, guides over which the portions of said adjacent runs between said rotatable elements pass to hold them against separation, means for actuating said endless members, gripping elements carried by said endless members to engage and grip the rod for advancing it, and means for adjusting the guides to cause the space between the said adjacent runs to be varied.

11. In an electric welding machine, spaced pairs of rotatable elements, the elements of each pair being spaced, one of the elements of each pair rotatable about a fixed axis, endless flexible members passing over the respective pairs of said elements, portions of the adjacent runs of the flexible members between the co-operating pairs of rotatable elements being parallel and spaced from each other to form a space therebetween for a weld rod, guides over which said adjacent portions of the runs between said rotatable elements pass to hold them against separation, means for actuating said endless members, gripping elements carried by said endless members to engage and grip the rod for advancing it, means for adjusting the guides to vary the size of the space between said runs, and means for adjusting the other one of the rotatable elements of each pair for controlling the slack in said endless members.

12. In an electric welding machine, spaced pairs of rotatable elements, the elements of each pair being spaced, endless flexible members passing over the respective pairs of said elements, adjacent runs of the flexible members being parallel and spaced from each other to form a space therebetween for a weld rod, guides over which the portions of the said adjacent runs of the endless elements between said rotatable elements pass to hold said portions against separation, means for actuating said endless members, gripping elements carried by said endless members to engage and grip the rod for advancing it, means for adjusting the guides to vary the size of the space between said runs, means for adjusting one of the rotatable elements of each pair when the guides are adjusted for controlling the slack in said endless members, and means common to said adjusting means for actuating them.

In testimony whereof I have signed my name to this specification, on this 25th day of June, A. D. 1931.

ALFRED F. KRUMHOLZ.